United States Patent
Van der Sijde et al.

(10) Patent No.: US 12,153,329 B2
(45) Date of Patent: *Nov. 26, 2024

(54) ACTUATOR TO BLUR DARK BANDS IN ILLUMINATION

(71) Applicant: Lumileds LLC, San Jose, CA (US)

(72) Inventors: Arjen Gerben Van der Sijde, Eindhoven (NL); Nicola Bettina Pfeffer, Eindhoven (NL); Asad Mughal, San Jose, CA (US)

(73) Assignee: Lumileds LLC, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/543,023

(22) Filed: Dec. 18, 2023

(65) Prior Publication Data
US 2024/0126144 A1   Apr. 18, 2024

Related U.S. Application Data

(63) Continuation of application No. 17/979,308, filed on Nov. 2, 2022, now Pat. No. 11,886,097.
(Continued)

(51) Int. Cl.
*G03B 15/05* (2021.01)
*G03B 15/03* (2021.01)
(Continued)

(52) U.S. Cl.
CPC ............ *G03B 15/05* (2013.01); *G03B 15/03* (2013.01); *F21V 14/02* (2013.01); *F21V 14/06* (2013.01);
(Continued)

(58) Field of Classification Search
CPC ............ G03B 15/05; G03B 15/03; G03B 2215/0567; F21Y 2115/10; F21V 14/02; F21V 14/06; F21V 33/0052
See application file for complete search history.

(56) References Cited

U.S. PATENT DOCUMENTS 7,920,205 B2 *  4/2011  Awazu ............... G03B 15/05
                                                 396/164
8,075,140 B2   12/2011  Phillips et al.
(Continued)

FOREIGN PATENT DOCUMENTS

CN        118511122 A     8/2024
KR     20170024052 A     3/2017
(Continued)

OTHER PUBLICATIONS

"U.S. Appl. No. 17/979,308, Corrected Notice of Allowability mailed Sep. 27, 2023", 2 pgs.
(Continued)

*Primary Examiner* — Bao Q Truong
(74) *Attorney, Agent, or Firm* — Schwegman, Lundberg & Woessner, P.A.

(57) ABSTRACT

A camera can capture an image of a scene during an exposure duration of the camera. An illumination system for the camera can include a light-emitting diode (LED) array. The LED array can include a plurality of LEDs that can produce light during the exposure duration of the camera. The LED array can include one or more non-emitting areas located between adjacent LEDs in the LED array. A lens can direct the light toward the scene as illumination. The illumination can include one or more dark bands corresponding to the one or more non-emitting areas of the LED array, optionally surrounding the LEDs in the LED array. An actuator can translate at least one of the LED array or the lens during the exposure duration of the camera so as to blur the one or more dark bands in the illumination in the image of the scene.

20 Claims, 2 Drawing Sheets

Related U.S. Application Data

(60) Provisional application No. 63/275,248, filed on Nov. 3, 2021.

(51) Int. Cl.
    *F21V 14/02*     (2006.01)
    *F21V 14/06*     (2006.01)
    *F21V 33/00*     (2006.01)
    *F21Y 115/10*    (2016.01)

(52) U.S. Cl.
    CPC ....... *F21V 33/0052* (2013.01); *F21Y 2115/10* (2016.08)

(56) References Cited

U.S. PATENT DOCUMENTS

| | | | | |
|---|---|---|---|---|
| 10,924,686 | B2 * | 2/2021 | Antretter | .................. G03B 7/16 |
| 2002/0025157 | A1 * | 2/2002 | Kawakami | ............... H04N 5/77 |
| | | | | 348/E5.038 |
| 2005/0231948 | A1 | 10/2005 | Pohlert et al. | |
| 2009/0073275 | A1 | 3/2009 | Awazu | |
| 2010/0178046 | A1 | 7/2010 | Moon et al. | |
| 2016/0246161 | A1 | 8/2016 | Wang | |
| 2018/0188641 | A1 * | 7/2018 | Chen | ..................... H01L 27/092 |
| 2020/0248890 | A1 * | 8/2020 | Osaka | ................ G02B 19/0014 |
| 2023/0133339 | A1 | 5/2023 | Van Der Sijde et al. | |

FOREIGN PATENT DOCUMENTS

| | | |
|---|---|---|
| KR | 20180052977 A | 5/2018 |
| KR | 20200072963 A | 6/2020 |
| WO | WO-2023081205 A1 | 5/2023 |

OTHER PUBLICATIONS

"U.S. Appl. No. 17/979,308, Notice of Allowance mailed Sep. 20, 2023", 10 pgs.

"International Application Serial No. PCT/US2022/048696, International Search Report mailed Mar. 14, 2023", 4 pgs.

"International Application Serial No. PCT/US2022/048696, Written Opinion mailed Mar. 14, 2023", 3 pgs.

\* cited by examiner

ACTUATOR TO BLUR DARK BANDS IN ILLUMINATION

CROSS-REFERENCE TO RELATED APPLICATIONS

This application is a continuation of U.S. patent application Ser. No. 17/979,308, filed Nov. 2, 2022, which claims the benefit of U.S. Provisional Application No. 63/275,248, filed on Nov. 3, 2021, the entirety of each of which is hereby incorporated by reference herein.

FIELD OF THE DISCLOSURE

The present disclosure relates to an illumination system, such as for a camera.

BACKGROUND OF THE DISCLOSURE

There is ongoing effort to improve illumination systems, such as for cameras.

BRIEF DESCRIPTION OF THE DRAWINGS

Corresponding reference characters indicate corresponding parts throughout the several views. Elements in the drawings are not necessarily drawn to scale. The configurations shown in the drawings are merely examples and should not be construed as limiting in any manner.

DETAILED DESCRIPTION

Figure 1:
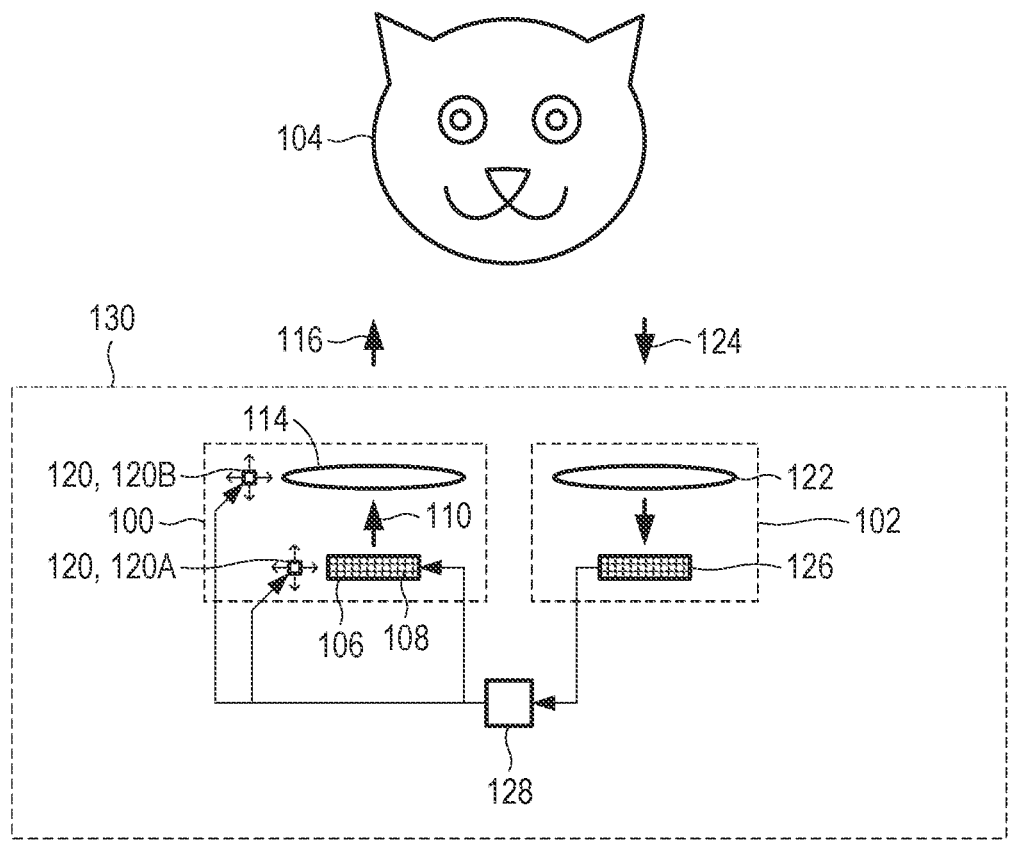
FIG. 1 shows a side view of an example of an illumination system for a camera, in accordance with some examples.

An illumination system for a camera can illuminate a scene with a light-emitting diode (LED) array and a collimating lens. The illumination system can have a problem of dark bands (e.g., non-emitting areas) of the LED array producing one or more dark bands in the illumination of the illuminated scene. To overcome the problem, the illumination system can use an actuator to translate at least one of the LED array or the collimating lens during an exposure duration of the camera, so as to blur the one or more dark bands in the illumination in the image of the scene, FIG. 1 shows a side view of an example of an illumination system 100 for a camera 102, in accordance with some examples. The camera 102 can capture an image of a scene 104 during an exposure duration of the camera 102. In FIG. 1, the scene 104 is shown as being a happy cat; other suitable scenes can also be used.

The illumination system 100 can include a light-emitting diode (LED) array 106. The LED array 106 can include a plurality of LEDs 108 that can produce light 110 during the exposure duration of the camera 102. The LED array 106 can include one or more non-emitting areas 212 (shown in FIG. 2) located between adjacent LEDs 108 in the LED array 106. In some examples, one or more of the non-emitting areas 212 can surround the LEDs 108 in the LED array 106.

Figure 2:
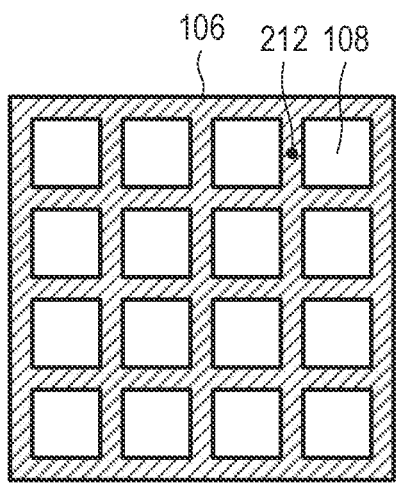
FIG. 2 shows a front view of an example of an LED array that can include one or more non-emitting areas located between adjacent LEDs in the LED array, in accordance with some examples.

FIG. 2 shows a front view of an example of an LED array 106 that can include one or more non-emitting areas 212 located between adjacent LEDs 108 in the LED array 106, in accordance with some examples. In some examples, the LED array 106 can include a monolithic LED that is segmented, where each segment (or subset of segments) can be individually addressed and powered. For the purposes of this document, such individually addressable segments are considered to be individual LEDs 108. In some examples, the LED array 106 can include LEDs 108 arranged in a 3-by-3 pattern. In some examples, the LED array 106 can include LEDs 108 arranged in a 4-by-5 pattern. In some examples, the LED array 106 can include LEDs 108 arranged in a 7-by-7 pattern.

Returning to FIG. 1, the illumination system 100 can include a lens 114. The lens 114 can direct the light 110 toward the scene 104 as illumination 116. The illumination 116 can include one or more dark bands 318 (shown in FIG. 3) corresponding to the one or more non-emitting areas 212 of the LED array 106.

Figure 3:
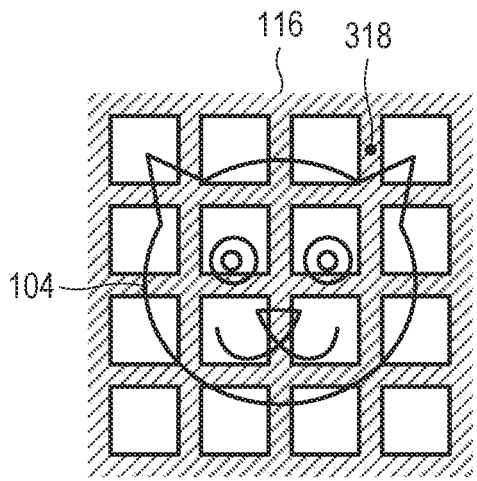
FIG. 3 shows a front view of an example of illumination that can include one or more dark bands corresponding to the one or more non-emitting areas of the LED array, in accordance with some examples.

FIG. 3 shows a front view of an example of illumination 116 that can include one or more dark bands 318 corresponding to the one or more non-emitting areas 212 of the LED array 106, in accordance with some examples.

Returning to FIG. 1, the illumination system 100 can include an actuator 120. The actuator 120 can translate at least one of the LED array 106 or the lens 114 during the exposure duration of the camera 102 so as to blur the dark bands 318 in the illumination 116 in the image of the scene 104. In some examples, the actuator 120A can translate the LED array 106 with respect to the lens 114. In some examples, the actuator 120B can translate the lens 114 with respect to the LED array 106. In some examples, the actuator 120 can translate both the lens and the array. For the purposes of this document, the actuator 120 can include a single element that can produce translation, such as 120A or 120B, or both elements 120A and 120B that can produce translation. The actuator 120 can include a single element for both the LED array 106 and the lens 114, or can alternatively include separate elements for the LED array 106 and the lens 114.

In some examples, the lens 114 can define a longitudinal axis that extends from the LED array 106, through a center of the lens 114, to the scene 104.

In some examples, the actuator 120 can be a one-dimensional actuator that can translate at least one of the LED array 106 or the lens 114 in an actuation direction that is angled with respect to the longitudinal axis. In some examples, the actuation direction can be generally orthogonal to the longitudinal axis. In some examples, the LED array 106 can be arranged in a two-dimensional pattern having a first array direction and a second array direction that is orthogonal to the first array direction. In some examples, the actuation direction can be angled with respect to the first array direction and angled with respect to the second array direction. In some examples, the LED array 106 can be arranged in a one-dimensional pattern that extends along an array direction. In some examples, the actuation direction can be non-orthogonal to the array direction. In some examples, the actuation direction can be generally parallel to the array direction. In some examples, the actuator 120 can translate at least one of the LED array 106 or the lens 114 in the actuation direction by a (peak-to-valley) distance greater than or equal to a width of a non-emitting area of the one or more non-emitting areas 212 of the LED array 106 during the exposure duration of the camera 102. The width can be a projected width along the actuation direction, which can be greater than the width along the orthogonal axes of the LED array 106. In some examples, the actuator 120 can oscillate at least one of the LED array 106 or the lens 114 in the actuation direction. In some examples, the oscillation can have an oscillation period that is less than the exposure duration of the camera, such as one-half of the exposure duration, one-fifth of the exposure duration, one-tenth of the exposure duration, or other suitable values.

In some examples, the actuator 120 can be a two-dimensional actuator that can translate at least one of the LED array 106 or the lens in an actuation plane that is angled with respect to the longitudinal axis. For example, the actuator 120 can include two movement-producing elements, with one element coupled to the LED array 106 and the other movement-producing element coupled to the lens 114. In some examples, the actuation plane can be generally orthogonal to the longitudinal axis.

In some examples, movement of the actuator 120 can vary as a function of which LEDs 108 in the LED array 106 are powered. For example, for a duration in which only a single row of LEDs 108 is powered, the actuator 120 can move in a direction that is parallel to the row. Similarly, for another duration in which only a single column of LEDs 108 is powered, the actuator 120 can move in a direction that is parallel to the column. In some examples, the actuator 120 can move in a rotational pattern, such as an oscillating pattern in a plane that can be generally orthogonal to the longitudinal axis. In some examples, the oscillating pattern can include a Lissajous pattern. In some examples, the actuator can include actuating elements that are orthogonal or substantially orthogonal. The actuating elements can approximate any suitable oscillating pattern using stair step operation. In some examples, the actuator 120 can include a translating element (e.g., an element that directly produces translation). In some examples, the actuator 120 can include a rotating element (e.g., an element that directly produces rotation, rather than translation). In some examples, the actuator 120 can produce movement that is entirely or partially along the longitudinal axis. The movement (or component of the movement) along the longitudinal axis can produce defocus, which can blur the dark bands in the illumination pattern.

The camera 102 can include a camera lens 122 that can collect reflected light 124 that is reflected from and/or emitted by the scene 104. The camera lens 122 can direct the reflect light 124 onto a multi-pixel sensor 126 to form an image of the scene 104 on the multi-pixel sensor 126. A controller 128 can receive a data signal that represents the image of the scene 104. The controller 128 can optionally additionally drive the actuator 120. In some examples, the controller 128 can cause the actuator 120 to move in a specified manner. For example, the controller 128 can receive a request to illuminate the scene 104 with a single segment of the LED array 106, or a single row or column of the LED array 106. The controller 128 can, in response to the request to illuminate the scene 104 in a particular manner, cause the actuator 120 to move in a specified manner. For example, the controller 128 can cause the actuator 120 to move in one dimension, an orthogonal dimension, or in one or more two-dimensional patterns. The controller 128 can optionally additionally drive the LEDs 108 in the LED array 106. For example, the controller can optionally control one or more LEDs 108 in the LED array 106 independent of another one or more LEDs 108 in the LED array 106, so as to illuminate the scene in a specified manner. For example, relatively close objects in the scene 104 may require a first amount of illumination, and relatively distant objects in the scene 104 may require a second amount of illumination, greater than the first amount, to have a same brightness in the image of the scene 104. Other configurations are also possible. The camera 102 and illumination system 100 can be disposed in a housing 130. In some examples, the housing 130 can be configured as a smart phone or other suitable device.

Figure 4:
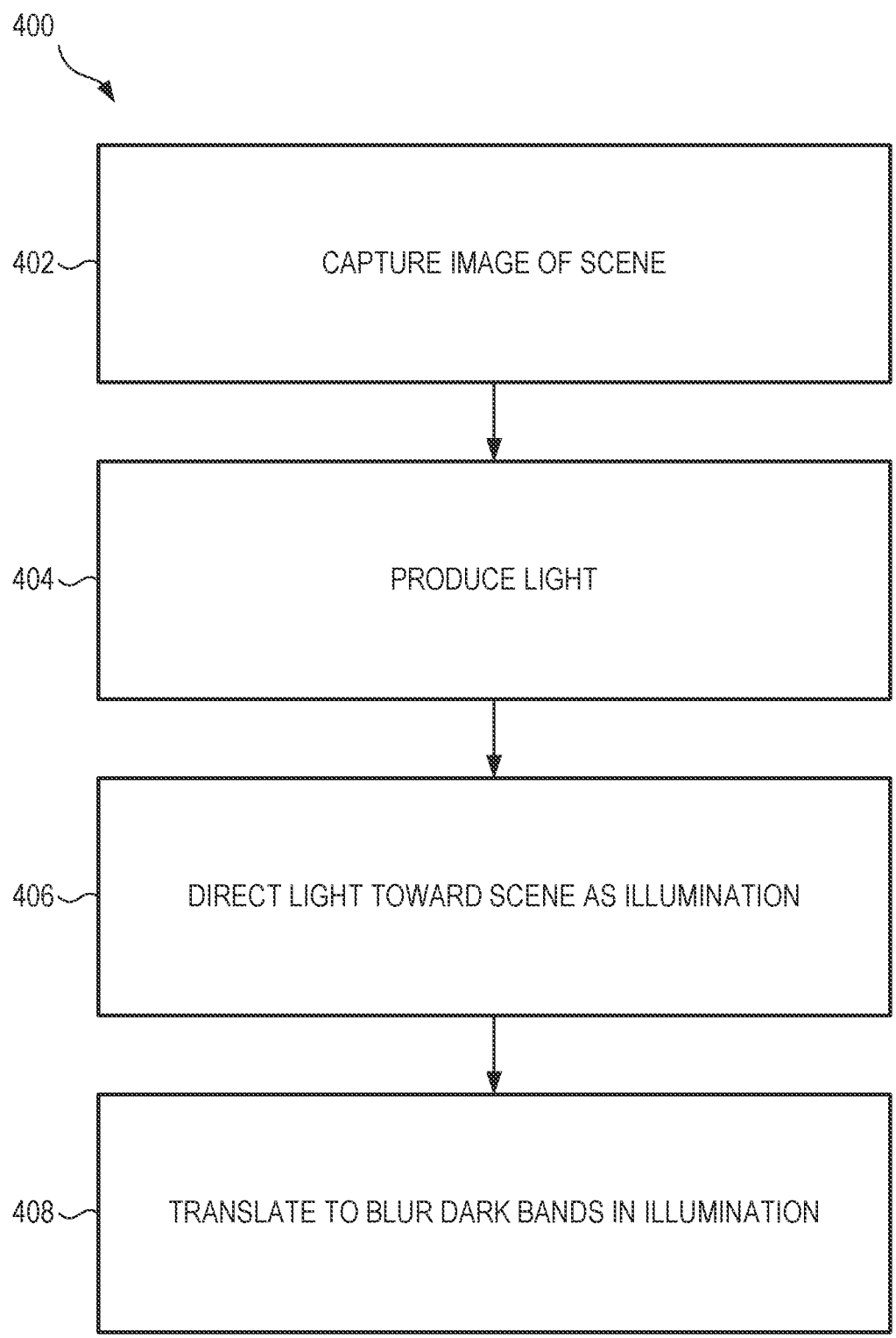
FIG. 4 shows a flowchart of an example of a method for illuminating a scene, in accordance with some examples.

FIG. 4 shows a flowchart of an example of a method 400 for illuminating a scene, in accordance with some examples. The method 400 can be executed by the illumination system 100, or by another suitable illumination system. The method 400 is but one method for illuminating a scene. Other suitable methods can also be used.

At operation 402, a camera, such as camera 102, can capture an image of the scene, such as scene 104, during an exposure duration of the camera.

At operation 404, an LED array, such as LED array 106, can produce light, such as light 110, during the exposure duration of the camera. The LED array can include a plurality of LEDs, such as LEDs 108, configured to produce the light. The LED array can include one or more non-emitting areas, such as non-emitting areas 212, located between adjacent LEDs in the LED array.

At operation 406, a lens, such as lens 114, can direct the light toward the scene as illumination, such as illumination 116. The illumination can include one or more dark bands, such as dark bands 318, corresponding to the one or more non-emitting areas of the LED array.

At operation 408, an actuator, such as actuator 120, can translate at least one of the LED array or the lens during the exposure duration of the camera so as to blur the dark bands in the illumination in the image of the scene.

In some examples, the lens can define a longitudinal axis that extends from the LED array, through a center of the lens, to the scene. In some examples, the actuator can be a one-dimensional actuator that translates at least one of the LED array or the lens in an actuation direction that is angled with respect to the longitudinal axis. In some examples, the actuator can be a two-dimensional actuator that translates at least one of the LED array or the lens in an actuation plane that is generally orthogonal to the longitudinal axis.

In some examples, the actuator can translate at least one of the LED array or the lens in the actuation direction by a distance greater than or equal to a width of the non-emitting area of the LED array during the exposure duration of the camera.

In some examples, the actuator can oscillate at least one of the LED array or the lens in the actuation direction. The oscillation can have an oscillation period that is less than the exposure duration of the camera.

In some examples, the lens can define a longitudinal axis that extends from the LED array, through a center of the lens, to the scene.

To further illustrate the systems and related methods disclosed herein, a non-limiting list of examples is provided below. Each of the following non-limiting examples can stand on its own or can be combined in any permutation or combination with any one or more of the other examples.

In Example 1, an illumination system for a camera, the camera configured to capture an image of a scene during an exposure duration of the camera, can include: a light-emitting diode (LED) array including a plurality of LEDs configured to produce light during the exposure duration of the camera, the LED array including a non-emitting area located between adjacent LEDs in the LED array; a lens configured to direct the light toward the scene as illumination, the illumination including a dark band corresponding to the non-emitting area of the LED array; and an actuator configured to translate at least one of the LED array or the lens during the exposure duration of the camera to blur the dark band in the illumination in the image of the scene, the dark band blurred in response to translation of the at least one of the array or the lens.

In Example 2, the illumination system of Example 1 can optionally be configured such that the actuator is configured to translate the LED array, the LED array translated with respect to the lens.

In Example 3, the illumination system of any one of Examples 1-2 can optionally be configured such that the actuator is configured to translate the lens, the lens translated with respect to the LED array.

In Example 4, the illumination system of any one of Examples 1-3 can optionally be configured such that the actuator is configured to translate both the lens and the LED array.

In Example 5, the illumination system of any one of Examples 1-4 can optionally be configured such that: the lens defines a longitudinal axis that extends from the LED array, through a center of the lens, to the scene; and the actuator is a one-dimensional actuator that is configured to translate at least one of the LED array or the lens in an actuation direction that is angled with respect to the longitudinal axis.

In Example 6, the illumination system of any one of Examples 1-5 can optionally be configured such that the actuation direction is generally orthogonal to the longitudinal axis.

In Example 7, the illumination system of any one of Examples 1-6 can optionally be configured such that: the LED array is arranged in a two-dimensional pattern having a first array direction and a second array direction that is orthogonal to the first array direction; and the actuation direction is angled with respect to the first array direction and angled with respect to the second array direction.

In Example 8, the illumination system of any one of Examples 1-7 can optionally be configured such that: the LED array is arranged in a one-dimensional pattern that extends along an array direction; and the actuation direction is non-orthogonal to the array direction.

In Example 9, the illumination system of any one of Examples 1-8 can optionally be configured such that the actuation direction is generally parallel to the array direction.

In Example 10, the illumination system of any one of Examples 1-9 can optionally be configured such that the actuator is configured to translate at least one of the LED array or the lens in the actuation direction by a distance greater than or equal to a width of the non-emitting area of the LED array during the exposure duration of the camera.

In Example 11, the illumination system of any one of Examples 1-10 can optionally be configured such that the actuator is configured to oscillate at least one of the LED array or the lens in the actuation direction.

In Example 12, the illumination system of any one of Examples 1-11 can optionally be configured such that the oscillation has an oscillation period that is less than the exposure duration of the camera.

In Example 13, the illumination system of any one of Examples 1-12 can optionally be configured such that: the lens defines a longitudinal axis that extends from the LED array, through a center of the lens, to the scene; and the actuator is a two-dimensional actuator that is configured to translate at least one of the LED array or the lens in an actuation plane that is angled with respect to the longitudinal axis.

In Example 14, the illumination system of any one of Examples 1-13 can optionally be configured such that the actuation plane is generally orthogonal to the longitudinal axis.

In Example 15, a method for illuminating a scene can include: capturing, with a camera, an image of the scene during an exposure duration of the camera; producing, with a light-emitting diode (LED) array, light during the exposure duration of the camera, the LED array including a plurality of LEDs configured to produce the light, the LED array including a non-emitting area located between adjacent LEDs in the LED array; directing, with a lens, the light toward the scene as illumination, the illumination including a dark band corresponding to the non-emitting area of the LED array; and translating, with an actuator, at least one of the LED array or the lens during the exposure duration of the camera to blur the dark band in the illumination in the image of the scene, the dark band blurred in response to translation of the at least one of the LED array or the lens.

In Example 16, the method of Example 15 can optionally be configured such that: the lens defines a longitudinal axis that extends from the LED array, through a center of the lens, to the scene; and the actuator is a one-dimensional actuator that translates at least one of the LED array or the lens in an actuation direction that is angled with respect to the longitudinal axis.

In Example 17, the method of any one of Examples 1516 can optionally be configured such that the actuator translates at least one of the LED array or the lens in the actuation direction by a distance greater than or equal to a width of the non-emitting area of the LED array during the exposure duration of the camera.

In Example 18, the method of any one of Examples 15-17 can optionally be configured such that the actuator oscillates at least one of the LED array or the lens in the actuation direction, the oscillation having an oscillation period that is less than the exposure duration of the camera.

In Example 19, the method of any one of Examples 15-18 can optionally be configured such that: the lens defines a longitudinal axis that extends from the LED array, through a center of the lens, to the scene; and the actuator is a two-dimensional actuator that translates at least one of the LED array or the lens in an actuation plane that is generally orthogonal to the longitudinal axis.

In Example 20, an illumination system can include: a camera configured to capture an image of a scene during an exposure duration of the camera; a light-emitting diode (LED) array including a plurality of LEDs configured to produce light during the exposure duration of the camera, the LED array including a non-emitting area surrounding the LEDs in the LED array; a lens configured to direct the light toward the scene as illumination, the illumination including one or more dark bands corresponding to the non-emitting area of the LED array; and an actuator configured to translate at least one of the LED array or the lens during the exposure duration of the camera so as to blur the one or more dark bands in the illumination in the image of the scene, the one or more dark hands blurred in response to translation of the at least one of the LED array or the lens.

In Example 21, an illumination system can include: at least one processor; and non-transitory memory including non-transitory instructions that, when executed by the processor, cause the processor to perform operations, the operations including: capturing, with a camera, an image of the scene during an exposure duration of the camera; producing, with a light-emitting diode (LED) array, light during the exposure duration of the camera, the LED array including a plurality of LEDs configured to produce the light, the LED array including a non-emitting area located between adjacent LEDs in the LED array; directing, with a lens, the light toward the scene as illumination, the illumination including a dark band corresponding to the non-emitting area of the LED array; and translating, with an actuator, at least one of the LED array or the lens during the exposure duration of the camera to blur the dark band in the illumination in the image of the scene, the dark band blurred in response to translation of the at least one of the LED array or the lens.

In Example 22, the illumination system of Example 21 can optionally be configured to include the limitations of any one of Examples 1-20.

While only certain features of the system and method have been illustrated and described herein, many modifications and changes will occur to those skilled in the art. It is, therefore, to be understood that the appended claims are intended to cover all such modifications and changes. Method operations can be performed substantially simultaneously or in a different order.

What is claimed is:

1. An illumination system, comprising:
   a light-emitting diode (LED) array including a plurality of LEDs configured to produce light, the LED array including a non-emitting area located between adjacent LEDs in the LED array;
   a lens configured to direct the light toward a scene as illumination, the illumination including a dark band corresponding to the non-emitting area of the LED array; and
   an actuator configured to translate at least one of the LED array or the lens to blur the dark band.

2. The illumination system of claim 1, wherein the actuator is configured to translate the LED array with respect to the lens.

3. The illumination system of claim 1, wherein the actuator is configured to translate the lens with respect to the LED array.

4. The illumination system of claim 1, wherein the actuator is configured to translate both the lens and the LED array.

5. The illumination system of claim 1, wherein:
   the lens defines a longitudinal axis that extends from the LED array, through a center of the lens, to the scene; and
   the actuator is a one-dimensional actuator that is configured to translate at least one of the LED array or the lens in an actuation direction that is angled with respect to the longitudinal axis.

6. The illumination system of claim 5, wherein the actuation direction is generally orthogonal to the longitudinal axis.

7. The illumination system of claim 5, wherein:
   the LED array is arranged in a two-dimensional pattern having a first array direction and a second array direction that is orthogonal to the first array direction; and
   the actuation direction is angled with respect to the first array direction and angled with respect to the second array direction.

8. The illumination system of claim 5, wherein:
   the LED array is arranged in a one-dimensional pattern that extends along an array direction; and
   the actuation direction is non-orthogonal to the array direction.

9. The illumination system of claim 8, wherein the actuation direction is generally parallel to the array direction.

10. The illumination system of claim 1, wherein the actuator is configured to translate at least one of the LED array or the lens by a distance greater than or equal to a width of the non-emitting area of the LED array.

11. The illumination system of claim 1, wherein the actuator is configured to oscillate at least one of the LED array or the lens with an oscillation amplitude that is greater than or equal to a width of the non-emitting area of the LED array.

12. The illumination system of claim 1, wherein:
   the lens defines a longitudinal axis that extends from the LED array, through a center of the lens, to the scene; and
   the actuator is a two-dimensional actuator that is configured to translate at least one of the LED array or the lens in an actuation plane that is angled with respect to the longitudinal axis.

13. The illumination system of claim 12, wherein the actuation plane is generally orthogonal to the longitudinal axis.

14. A method for illuminating a scene, the method comprising:
   producing light with a light-emitting diode (LED) array, the LED array including a plurality of LEDs configured to produce the light, the LED array including a non-emitting area located between adjacent LEDs in the LED array;
   directing, with a lens, the light toward the scene as illumination, the illumination including a dark band corresponding to the non-emitting area of the LED array; and
   translating, with an actuator, at least one of the LED array or the lens to blur the dark band.

15. The method of claim 14, wherein:
   the lens defines a longitudinal axis that extends from the LED array, through a center of the lens, to the scene; and
   the actuator is a one-dimensional actuator that translates at least one of the LED array or the lens in an actuation direction that is angled with respect to the longitudinal axis.

16. The method of claim 15, wherein the actuator translates at least one of the LED array or the lens in the actuation direction by a distance greater than or equal to a width of the non-emitting area of the LED array.

17. The method of claim 15, wherein the actuator oscillates at least one of the LED array or the lens in the actuation direction.

18. The method of claim 14, wherein:
   the lens defines a longitudinal axis that extends from the LED array, through a center of the lens, to the scene; and
   the actuator is a two-dimensional actuator that translates at least one of the LED array or the lens in an actuation plane that is generally orthogonal to the longitudinal axis.

19. An illumination system, comprising:
   a light-emitting diode (LED) array including a plurality of LEDs configured to produce light, the LED array including a non-emitting area surrounding the LEDs in the LED array;

a lens configured to direct the light toward a scene as illumination, the illumination including one or more dark bands corresponding to the non-emitting area of the LED array; and an actuator configured to translate at least one of the LED array or the lens in an actuation direction to blur the one or more dark bands, the LED array being arranged in a two-dimensional pattern having a first array direction and a second array direction that is orthogonal to the first array direction, the actuation direction being angled with respect to the first array direction and angled with respect to the second array direction.

20. The illumination system of claim 19, wherein the actuator is configured to oscillate at least one of the LED array or the lens in the actuation direction.

* * * * *